United States Patent [19]

Guerinault et al.

[11] 4,231,631
[45] Nov. 4, 1980

[54] THROUGH-CONNECTOR PROVIDING AN ELECTRICAL CONNECTION THROUGH A SINGLE OR DOUBLE PLASTIC WALL AND APPLICATION THEREOF TO AN ELECTRICAL BATTERY

[75] Inventors: Jean-Marc Guerinault, Merignac; Jacques Barber, Lormont, both of France

[73] Assignee: Saft-Societe des Accumulateurs Fixes et de Traction, Romainville, France

[21] Appl. No.: 970,067

[22] Filed: Dec. 15, 1978

[30] Foreign Application Priority Data

Jan. 18, 1978 [FR] France .................................. 78 01347

[51] Int. Cl.³ .............................................. H01R 7/02
[52] U.S. Cl. ................................ 339/94 A; 339/60 C; 339/152
[58] Field of Search ..................... 339/94 A, 94 R, 152, 339/60 R, 60 C, 187, 175 R, 175 C, 186 R, 219 R; 174/138 D, 153 R; 361/410, 412

[56] References Cited

U.S. PATENT DOCUMENTS

| | | | |
|---|---|---|---|
| 2,418,729 | 4/1947 | Schemers | 339/94 A X |
| 3,613,048 | 10/1971 | Brundza | 339/94 A X |
| 3,775,730 | 11/1973 | Rowls et al. | 339/60 C X |
| 3,850,501 | 11/1974 | Butterfield et al. | 339/94 A X |
| 3,992,075 | 11/1976 | Cannarsa | 339/94 R X |

*Primary Examiner*—Richard B. Lazarus
*Assistant Examiner*—DeWalden W. Jones
*Attorney, Agent, or Firm*—Kenyon & Kenyon

[57] ABSTRACT

A sealed through-connector in which an electrical connection passes through a hole (4) in a single or double wall made of a plastic material, said connector including a first annular seal ring which seals the annular zone of the orifice left free by the connection and being compressed axially. According to the invention, the connector is axially compressed by clamping means which are applied on either side of the wall (1) to two metal parts (9,10) which each have a surface substantially parallel to said wall (1), the distance between said surfaces and therefore the compression of the seal (8) being defined by the insertion of a metal distance member (5).

Use: Storage batteries which use hard metal connection parts which melt at high temperatures, e.g. alkaline electrolyte storage batteries.

11 Claims, 8 Drawing Figures

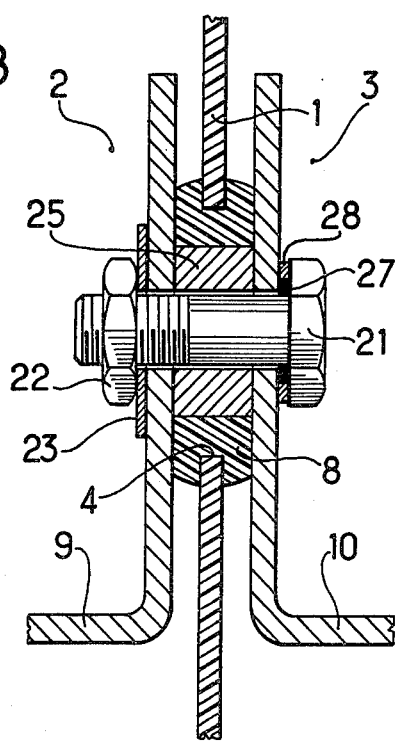
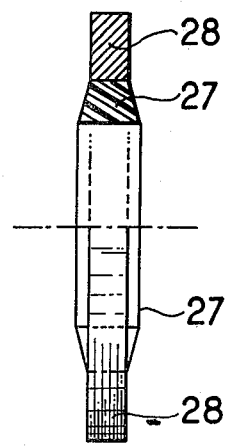
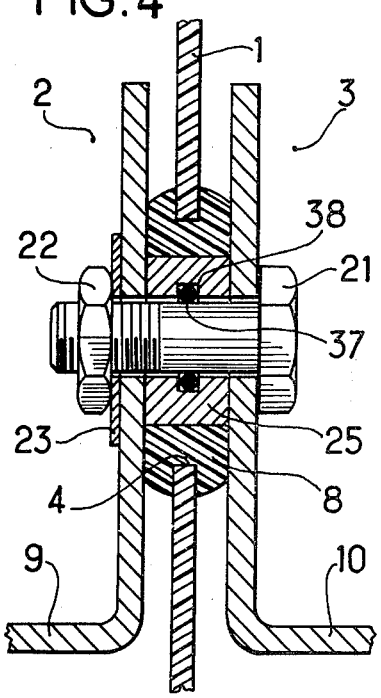
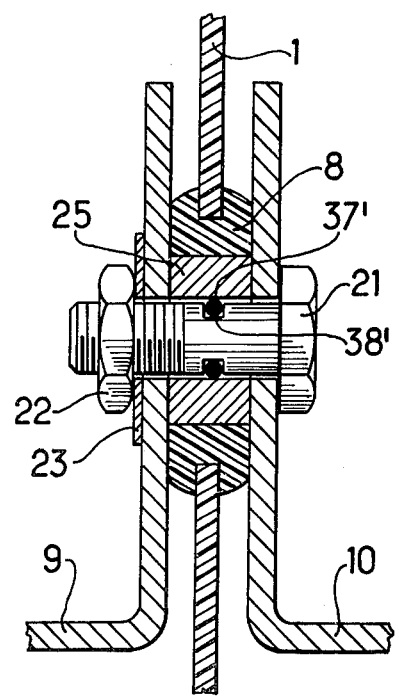

THROUGH-CONNECTOR PROVIDING AN ELECTRICAL CONNECTION THROUGH A SINGLE OR DOUBLE PLASTIC WALL AND APPLICATION THEREOF TO AN ELECTRICAL BATTERY

FIELD OF THE INVENTION

The invention relates to a sealed through-connector providing an electrical connection which passes through a hole in a single or double wall made of a plastic material, and to the application thereof to a storage battery. It is particularly applicable for interconnecting two electrodes of two cells separated by such a wall. A single wall can be provided between two cells in the single casing of a one-piece storage battery. Further, there can be provided a double wall formed by juxtaposing two walls of independent casings of two adjacent storage cells.

DESCRIPTION OF THE PRIOR ART

French Patent No. 71 02 851, (publication No. 2 123 712) describes a sealed through-connector in which an electrical connection passes between an electrode and an outside terminal of a lead-acid storage battery. The connection passes through a hole in the wall of larger diameter than that of the connection, and an annular seal ring occupies the annular zone of the hole left free by the connection. The seal ring is axially compressed between a tab connected to the electrode and the terminal so as to seal the contact between the seal ring, the wall and the connection. The connection is itself formed by melting together lead protrusions of the tab and of the terminal respectively when the seal ring is compressed, by bringing the two parts against each other through the opening in the wall.

It is self-evident that such a device which is suitable for leadacid storage cells in which the connecting parts are made of lead cannot be used when the connecting parts are made of harder metals which melt at a higher termperature, for example steel, nickel-plated steel, nickel or nickel alloys which are usually employed in alkaline electrolyte storage cells.

The invention aims in particular to produce a sealed through-connector which can be used with any metal.

SUMMARY OF THE INVENTION

The invention provides a sealed through-connector in which an electrical connection passes through a hole in a single wall or double wall made of a plastic material, said connector including a first annular seal ring which seals the annular zone of the orifice left free by the connection and being compressed axially, characterized in that the connector is axially compressed by clamping means which are applied on either side of the wall to two metal parts which each have a surface substantially parallel to said wall, the distance between said surfaces and therefore the compression of the seal being defined by the insertion of a metal distance member.

Connection by melting such as described in the above-mentioned French Patent No. 71 02 851 is replaced by clamping means which provide metal-to-metal contact, thereby providing stable electrical contact even in the case of permanent deformation of the seal subsequent to aging, or in the case of creep of the plastic material along the wall.

In one embodiment of the invention, the distance member is in the form of a projection which extends from said surface of one of the two parts.

In another embodiment, said distance member is formed by a protrusion which extends from each of said surfaces, the two protrusions bearing against each other.

In another embodiment, said distance member is a metal spacer with two surfaces parallel to the wall and situated on either side thereof and on which the two surfaces of the above-mentioned metal parts bear respectively.

At least one of said two surfaces of the spacer can be constituted by a shoulder beyond which extends a threaded portion which passes through the corresponding metal part and accomodates a nut which clamps said part on said shoulder. Similarly, at least one of said two surfaces of the spacer can be an end surface in which is drilled a tapped blind hole in which is engaged a screw which passes through the metal part and clamps it on said end surface.

According to a variant of the invention, the spacer is a ring through which said clamping means pass which can be constituted by a screw and a nut. This variant provides the advantage of allowing easier assembly, in particular in the case of an intermediate connection in a one-piece battery. Since the inside of the ring opens a passage for the electrolyte between the two compartments situated on either side of the wall, a second annular seal ring must in this case be provided round the clamping means.

BRIEF DESCRIPTION OF THE DRAWINGS

The invention will be better understood from the description of a few embodiments given by way of non-limiting illustrations with reference to the accompanying drawings in which:

FIG. 3 shows a variant of the through-connector illustrated in FIG. 1;

FIG. 3a is an enlarged half cut-away cross-section of a seal ring and washer assembly used in the through-connector illustrated in FIG. 3; and FIGS. 4, 5, 6 and 7 are similar views to FIGS. 1 and 3 which show storage batteries with individual containers, each showing variants of the through-connector in accordance with the invention.

DETAILED DESCRIPTION

Figure 1:
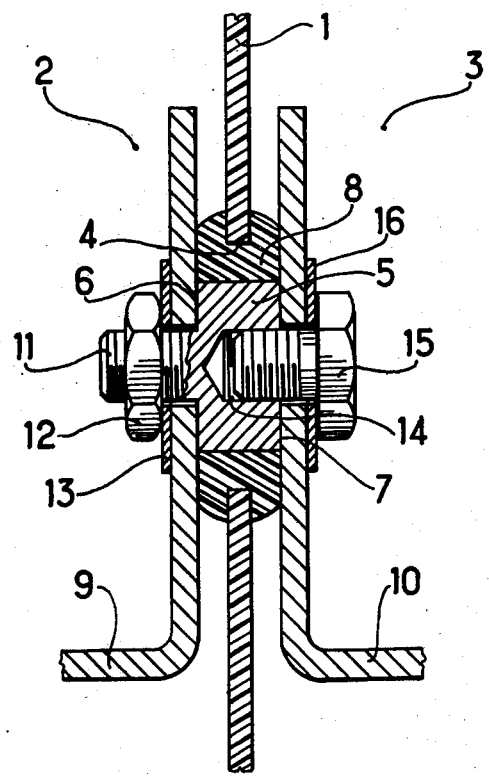
FIG. 1 is a partial cross-section of a one-piece storage battery which includes a sealed through-connector in accordance with the invention.
Figure 2:
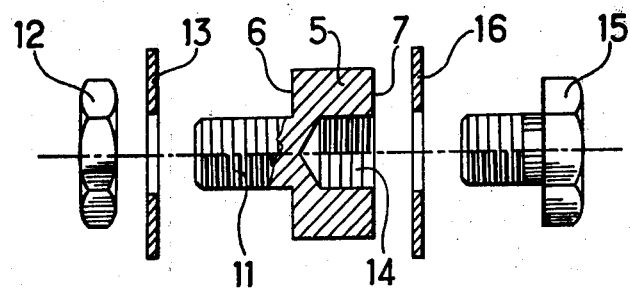
FIG. 2 is an exploded view of the clamping means illustrated in FIG. 1.

FIG. 1 illustrates a sealed through-connector in a plastic wall 1, for connecting two electrodes, not shown, situated respectively in two compartments 2 and 3 of a one-piece storage battery, which compartments are separated by the wall 1. Said wall has a hole 4 inside which is placed a metal distance member 5 which has two surfaces 6 and 7 parallel to the wall 1, situated on either side thereof. The annular space formed between the distance member 5 and the edge of the orifice 4 is occupied by a grommet type seal ring 8 which is compressed axially, i.e. perpendicularly to the wall 1, between two metal parts 9 and 10 with adjacent surfaces substantially parallel to said wall, said parts bearing respectively on the surfaces 6 and 7 and being connected respectively to the two storage cell electrodes between which the connection is formed. As is clearly apparent if FIG. 2, the surface 6 of the distance member is constituted by a shoulder beyond which a threaded rod 11 extends through the part 9. The part 9 and the shoulder 6 are clamped together by means of a washer 13 and a nut 12 screwed onto the threaded rod 11. The surface 7 constitutes an end surface of the distance member 5 in which there is a tapped blind hole 14 in which a screw 15 is engaged, said screw passing through the part 10 and clamping it against the surface 7 with a washer 16 interposed.

It is seen that the clamping means constituted by the threaded rod 11, the nut 12, the hole 14 and the screw 15 compress the seal 8 and consequently prevent liquid from passing through the connector. Indeed, the only passage between the compartments 2 and 3 is the annular space sealed by the ring 8. Further, the clamping means clamp the parts 9 and 10 on either side of the wall 1 and press them against the surfaces of the distance member 5, thereby providing reliable electrical connection between them. Therefore, the compression of the seal ring 8 depends on the distance between the surfaces of the parts 9 and 10 and therefore on the thickness of the distance member 5. The electrical connection obtained remains stable through time, even in the case where the seal ring 8 or the wall 1 are deformed.

Two threaded rods and nuts on either side of the distance member body or two blind holes and screws on either surface of the distance member body could provide similar clamping. In that case, the blind holes may be coaxial, or they can have different axes.

The device illustrated in FIG. 3 is partially constituted by the same components as those in FIG. 1, which bear the same reference symbols. The device in FIG. 3 differs from the one in FIG. 1 mainly in that the distance member is a ring 25 through which passes a screw 21 which also passes through the parts 9 and 10 and carries a nut 22. The clamping means are therefore constituted by the screw 21 and the nut 22, with a washer 23. The bore of the ring 25 provides a passage for the electrolyte between the compartments 2 and 3. To seal the through-connector, the passage is blocked by a second resilient seal 27 which surrounds the shank of the screw 21 and is itself surrounded by a metal washer 28 which is integral with it, as shown in FIG. 3a which illustrates the assembly before it is assembled. The seal 27 is therefore radially compressed between the shank of the screw and the washer 28 and is also axially compressed between the head of the screw 21 and the part 10 by clamping the screw and the nut, thereby also clamping the seal 8. Like the compression of the seal 8, that of the seal 27 is limited by metal-to-metal contact between the washer 28 and the screw head on one side and the part 10 on the other. Therefore, the aging of this seal cannot result in play which is detrimental to the quality of the electrical connection.

FIGS. 4 and 5 illustrate two variants of the device in FIG. 3. The seal 27 and the washer 28 shown in FIG. 3 are replaced in FIG. 4 by an O ring 37 fitted in a groove 38 which is formed in the ring 25 and in FIG. 5 by an O ring 37' fitted in a groove 38' provided in the screw 21.

Figure 6:
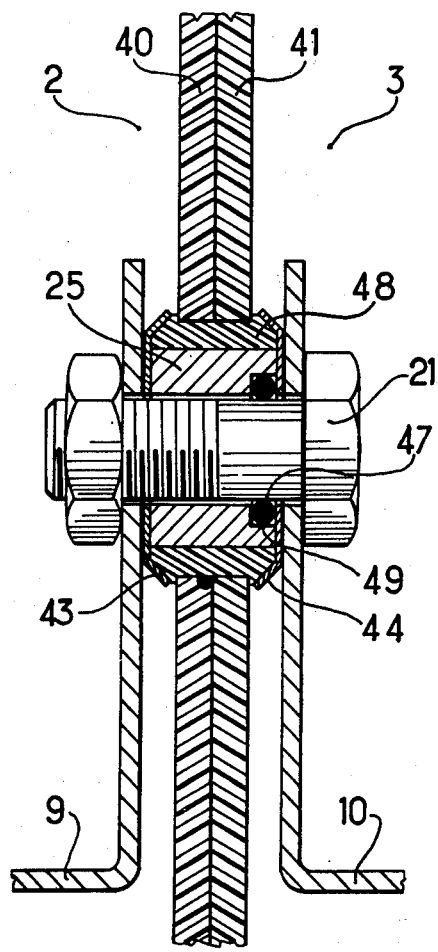

FIG. 6 illustrates another variant in which the wall through which the connector passes is double, i.e. it is formed by juxtaposing a wall 40 which delimits the compartment 2 and a wall 41 which delimits the compartment 3. The grommet type seal 8 is replaced in this variant by a seal 48 with a rectangular cross-section. Two metal cupped bearing washers 43 and 44 are inserted respectively between the parts 9 or 10 on one side and the ring 25 and a seal 48 on the other. The cupped washers 43 and 44 are curved towards the walls 40 and 41 so as to provide sealed contact between these latter and the seal 48. Such contact simultaneously prevents electrolyte from passing between the compartments 2 and 3 and between each of these compartments and the space between the two walls, i.e. the space outside the storage cells. A seal 47 similar to the seal 37 shown in FIG. 4 is recessed in a groove 49 formed in the ring 25 and limited thereby as well as by the shank of the screw 21 and by the cupped washer 44.

In accordance with a variant, not shown, the seal 47 can be recessed in a groove formed in the screw 21 like the seal 37' in FIG. 5.

Figure 7:
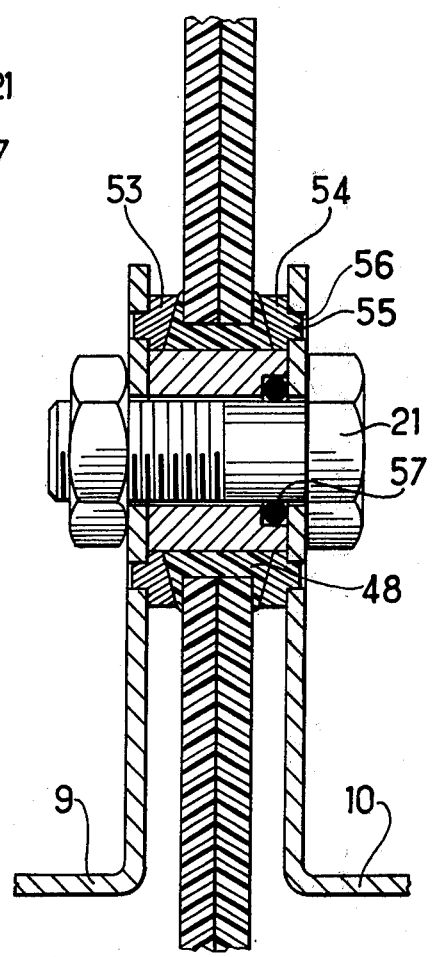

The embodiment in FIG. 7 differs from the one in FIG. 6 in that the cupped washers 43 and 44 are replaced by plastic parts 53 and 54 inserted respectively between the parts 9 or 10 on one side and a seal 48 on the other, the ring 25 and a seal 57 being in direct contact with the parts 9 and 10. The parts 53 and 54 are fixed by protrusions 55 which engage in holes 56 in the parts 9 and 10.

In accordance with one variant, not shown, the seal 57 can be recessed in a groove formed in the screw 21, like the seal 37' in FIG. 5.

The characteristics of the variants described can be combined differently. Thus, a seal such as 8 (FIGS. 1,3,4 and 5) can be used with a double wall, or a seal such as 48 (FIGS. 6 and 7) can be used with a single wall. A seal and washer assembly such as 27-28 (FIG. 3) can be used instead of the seals 47 and 57 in the devices illustrated in FIGS. 6 and 7 and the seal 57 can replace the seal 37 shown in FIG. 4. A distance member such as shown in FIG. 1 can be combined with a rectangular seal such as 48 and/or with a double wall.

Other modifications can be made to the embodiments described without thereby going beyond the scope of the invention. Thus, the shapes of the parts 9 and 10 can be modified, their adjacent surfaces not necessarily being plane. As stated previously, the distance member can be replaced by a projection integral with one of these parts or by protrusions or projections on both these parts, as in the above-mentioned patent application No. 71 02 851.

We claim:

1. A sealed electrical through-connector assembly including a barrier of predetermined thickness; a connecting member extending through a hole in the barrier; a resilient annular seal ring surrounding the connecting member, the seal ring having an uncompressed thickness greater than the thickness of the barrier and an outer perimetral surface making sealing contact with the inner surface of the hole through the barrier; a first metal part mounted on said connecting member and positioned on one side of said seal ring; a second metal part mounted on the connecting member and positioned on the other side of the seal ring; and means for applying a releasable clamping force against said metal parts for axially compressing said seal ring, wherein the improvement comprises:

rigid spacer means defining the positions of said parts relative to each other, thereby determining a fixed compression of the seal ring for any clamping force above a predetermined minimum valve.

2. A through-connector assembly according to claim 1 wherein the spacer means comprises a metal member having two oppositely facing parallel surfaces, and said metal parts bear against said respective surfaces.

3. A through-connector assembly according to claim 2 wherein said spacer means comprises part of said connecting member, and said clamping means comprises an externally threaded portion extending from one of said spacer surfaces through the adjacent one of the metal parts and an internally threaded member screwed onto the externally threaded portion and clamping said adjacent one of the metal parts against said one spacer surface.

4. A through-connector assembly according to claim 2 wherein said spacer means comprises part of said connecting member and has a tapped blind hole in one of said parallel surfaces, and said clamping means comprises a screw passing through the corresponding metal part and screwed into the tapped hole to clamp said corresponding metal part against said one spacer surface.

5. A through-connector assembly according to claim 1 or 2 wherein said spacer means is an annular cylindrical ring surrounding said connecting member, the outer peripheral surface of said spacer ring making sealing contact with an inner surface of said annular seal ring, and the connector assembly further comprises at least one additional resilient seal ring positioned around and in sealing contact with the connecting member.

6. A through-connector assembly according to claim 5 wherein said additional resilient seal ring makes sealing contact with the spacer ring.

7. A through-connector assembly according to claim 5 wherein said additional resilient seal ring makes sealing contact with one of said metal parts.

8. A through-connector assembly according to claim 5 wherein said connecting member comprises a threaded bolt having a head at one end, said head bearing against one of said metal parts, and the clamping means comprises a nut threadably engaged with the other end of said bolt and bearing against the other of said metal parts.

9. A through-connector assembly according to claim 1 wherein the barrier comprises at least one wall made of a plastic material.

10. A through-connector assembly according to claim 1 wherein the barrier comprises two abutting walls made of a plastic material.

11. A through-connector assembly according to claim 9 or 10 wherein said at least one plastic wall separates two adjacent compartments of a storage battery, and the two metal parts are electrically connected to corresponding electrodes in the respective compartments.

* * * * *